United States Patent [19]
Kubis et al.

[11] Patent Number: 4,867,118
[45] Date of Patent: Sep. 19, 1989

[54] CYLINDER HEAD AND COMBUSTION CHAMBER SEALING ARRANGEMENT FOR A RECIPROCATING PISTON

[75] Inventors: Heribert Kubis, Nürnberg; Josef Winter, Rednitzhembach, both of Fed. Rep. of Germany

[73] Assignee: Man Nutzfahrzeuge GmbH, München, Fed. Rep. of Germany

[21] Appl. No.: 234,210

[22] Filed: Aug. 19, 1988

[30] Foreign Application Priority Data

Aug. 19, 1987 [DE] Fed. Rep. of Germany ........ 3727598

[51] Int. Cl.⁴ .............................................. F02F 11/10
[52] U.S. Cl. ............................ 123/193 CH; 123/41.84
[58] Field of Search ....................... 123/193 CH, 41.84

[56] References Cited

U.S. PATENT DOCUMENTS

| | | | |
|---|---|---|---|
| 3,396,711 | 8/1968 | Fangman et al. | 123/193 CH |
| 3,410,256 | 11/1968 | Herschmann | 123/193 CH |
| 3,653,369 | 4/1972 | Fangman et al. | 123/193 CH |
| 4,112,907 | 9/1978 | Nikly | 123/193 CH |
| 4,791,891 | 12/1988 | Kubis et al. | 123/41.84 |

Primary Examiner—E. Rollins Cross
Attorney, Agent, or Firm—Becker & Becker, Inc.

[57] ABSTRACT

A cylinder head and combustion chamber sealing arrangement that is subdivided into a sealing element in the cylinder liner region (especially for sealing gas) and a sealing element in the cylinder block region. Both sealing elements are made of solid metal. The sealing element for gas sealing, which is disposed in the liner-collar recess, is stressed in a certain range beyond the yield limit of the material by tightening the cylinder head screws. To improve the gas sealing, on the one hand a circumferential groove is provided in the cylinder head opposite the recess in the cylinder liner collar, and on the other hand the recess itself is provided with either a circumferential groove or a circumferential rib. By this means, the liner sealing element is stressed beyond the material yield level in the specific region of its outer and inner perimeters.

1 Claim, 2 Drawing Sheets

CYLINDER HEAD AND COMBUSTION CHAMBER SEALING ARRANGEMENT FOR A RECIPROCATING PISTON

BACKGROUND OF THE INVENTION

The present invention relates to a cylinder head and combustion chamber sealing arrangement for a reciprocating piston engine. The sealing arrangement is subdivided into a sealing element in the cylinder liner region, and a sealing element in the cylinder block region, with both sealing elements being made of solid metal. The sealing element in the liner area (combustion chamber seal) is disposed in a recess in the liner collar, which is supported on he cylinder block. This recess opens radially outwardly and adjoins a so-called fire prevention collar or raised edge. The sealing element is stressed in a certain range beyond the Yield limit of the material by tightening the cylinder head screws, with the yielding process, linked to the deformation of the sealing element, being limited by the thickness of the sealing element in the cylinder block area, and by the extent to which the base surface of the liner-collar recess is lower than the end face of the cylinder block.

A combustion chamber sealing arrangement o this general type is described in applicants' copending U.S. patent application Ser. No. 028,602, filed Mar. 20, 1987, now U.S. Pat. No. 4,791,891. With this arrangement, only the sealing region in the vicinity of the raised portion on the sealing collar of the cylinder liner is stressed beyond the yield limit of the material, with the free deformability of the sealing region in the vicinity of the raised portion, in other words the yield effect, being adversely affected by the supporting action of the adjoining inner and outer ring-shaped sealing parts beyond the actual seal-raised portion-support area, these sealing parts not being directly loaded.

It is therefore an object of the present invention to further improve the cylinder head and combustion chamber sealing arrangement of the aforementioned general type.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The sealing arrangement of the present invention is characterized primarily in that on the one hand a circumferential groove is provided in the cylinder head opposite the recess in the cylinder liner collar, and in that on the other hand the recess itself either has a circumferential groove or a circumferential rib into which penetrates or with which engages or interlocks the liner sealing element when the cylinder head screws are tightened, whereby however the grooves are only partially filled, and a positive contact results in the flank region of the grooves or of the rib.

In this way, the compression forces, which deform the seal element beyond the yield limit, are introduced into the outer and inner perimeter areas of the sealing element, i.e. beyond the grooves or the rib. This results in a better utilization by area of the seal. The seal material can yield to the inside and to the outside when compressed, with the inevitable increase in the radial extension taking place relatively unhindered. A better lateral securing is also obtained.

Further specific features of the present invention will be described in detail subsequently.

DESCRIPTION OF PREFERRED EMBODIMENTS

Figure 1:
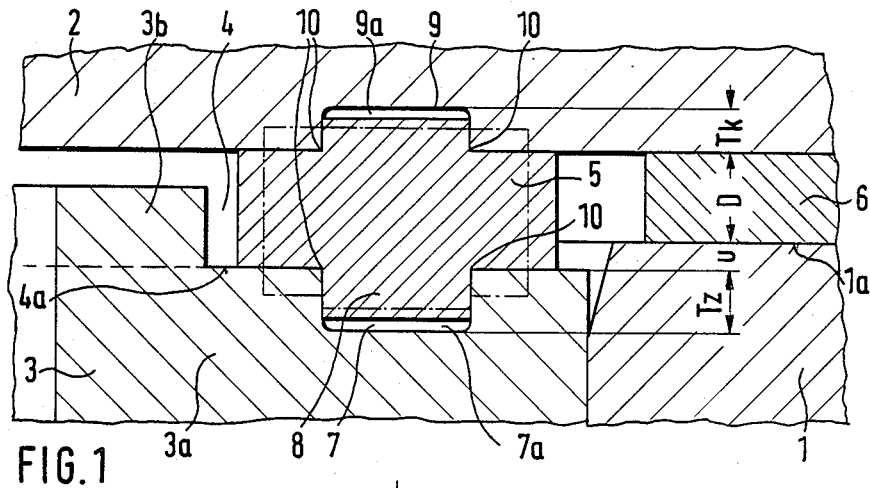
FIG. 1 is an enlarged partial cross-sectional view of a first exemplary embodiment of the inventive sealing arrangement between the cylinder head and the cylinder liner and cylinder block, with the sealing element having a centering rib.

Referring now to the drawings in detail, FIG. 1 shows a first exemplary embodiment of a sealing joint or arrangement between the cylinder head 2 and the cylinder barrel or liner 3 or the crankcase or cylinder block 1. For this purpose, a sealing element 5 and a sealing element 6, which is separate from the sealing element 5, are used, with the gas leakage outlet channel being disposed between the two sealing elements 5 and 6, which are composed of solid metal, preferably a ferrous material. The cylinder liner 3 is supported in a known way on the cylinder block 1 by means of the liner collar 3a. The face of the collar 3a on the cylinder head side has a fire prevention collar or raised edge 3b on the combustion chamber side. The adjoining area, which opens radially outwardly, has an open annular recess 4 into which the sealing element 5 is inserted. In the non-compressed state (compare the dot-dash line), this sealing element 5 has a T-shaped cross-section. The base surface 4a (support area for the sealing element 5) of the recess 4 has an encircling or circumferential groove 7 in its middle region. The non-compressed sealing element 5 is centered in this groove 7 with the aid of the post or rib 8 that is disposed on the underside of the sealing element. Opposite the groove 7, with a slight lateral displacement due to the groove width tolerances and the tolerances of the cylinder head securing being permissible, an encircling or circumferential groove 9 is also recessed in the bottom of the cylinder head 2. During the deformation resulting when the cylinder head screws are tightened, the groove edges 10 of the grooves 7 and 9 cut into the sealing element 5, which is simultaneously deformed in the support area, on its inner and outer perimeters, beyond the material yield limit, and is compressed or deformed to the extent (as described in the aforementioned U.S. patent application Ser. No. 028,602) predetermined by the thickness D of the seal in the remaining area (i.e. the sealing element 6 in the cylinder block region) and the extent U by which the recess base surface 4a is lower than the end face 1a of the cylinder block 1. The increase in the radial extension of the sealing element 5 to the outside and the inside takes place relatively unhindered, since there is no supporting effect from the unstressed peripheral areas (compare U.S. patent application Ser. No. 028,602), which increases the work of deformation. At the same time, the depths $T_z$ and $T_x$ (relating on the one hand to the support surface 4a and on the other hand to the bottom surface of the cylinder head 2) of the groove recesses 7 and 9 are such that inevitable deformation toward the center of the sealing element can also take place unhindered, since even after compression of the element, empty spaces 7a or 9a remain at the bases of the grooves 7 and 9.

The compression of the sealing element 5 into the grooves 7 and 9 gives rise to a positive flank contact between the sealing element 5 and the cylinder head 2 and cylinder liner 3, which together with the support surfaces in the direction of the compression force form a labyrinth seal for ensuring a good gas seal. In addition, an improved clamping of the cylinder liner S and the cylinder head 2 results from the inventive sealing arrangement; this clamping inhibits the feared lateral movement of the cylinder liner 3 caused by the alternating piston standard pressure.

Figure 2:
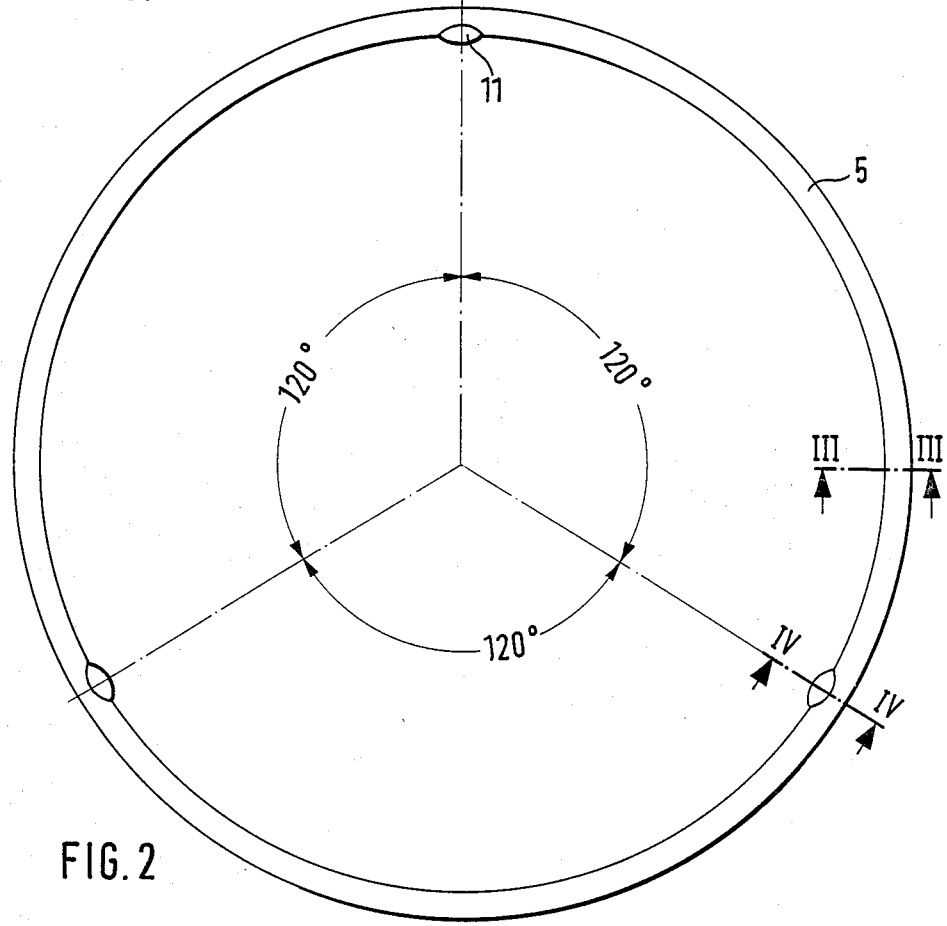
FIG. 2 is a top view of an inventive sealing element that has three uniformly distributed centering cams on its inner perimeter.

FIG. 2 shows a sealing element 5 with which, in the interest of lower production costs, the use of a centering post or rib 8 to fix the sealing element 5 in the groove 7 of the cylinder liner 3 has been dispensed with. This sealing element is used in the embodiment of FIGS. 3 and 4. The necessary securing or fixing of the sealing element 5 is effected by three deformed centering cams 11 that are uniformly distributed over the inner perimeter of the element (compare FIGS. 2 and 4). The centering cams 11 ensure that there is a space between the raised edge 3b of the cylinder liner 3 and the sealing element 5, with this space being necessary for free expansion to the inside caused by the deformation of the sealing element. As a result of the absence of the rib 8, the grooves 7 and 9 in the cylinder liner 3 and the cylinder head 2, which grooves are approximately opposite one another, can have the same depth of recess.

Figure 3:
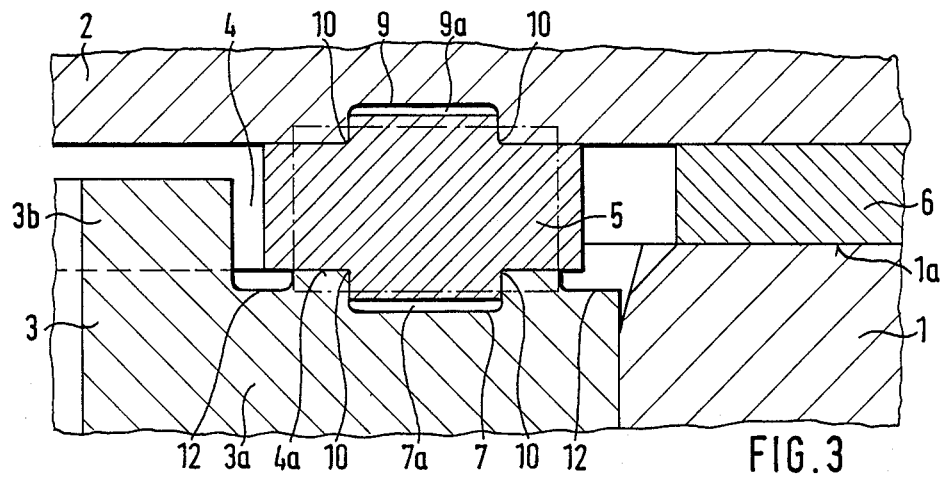
FIG. 3 is an enlarged cross-sectional view of a second exemplary embodiment of the inventive sealing arrangement using the sealing element in FIG. 2 and taken along the line III—III in FIG. 2.
Figure 4:
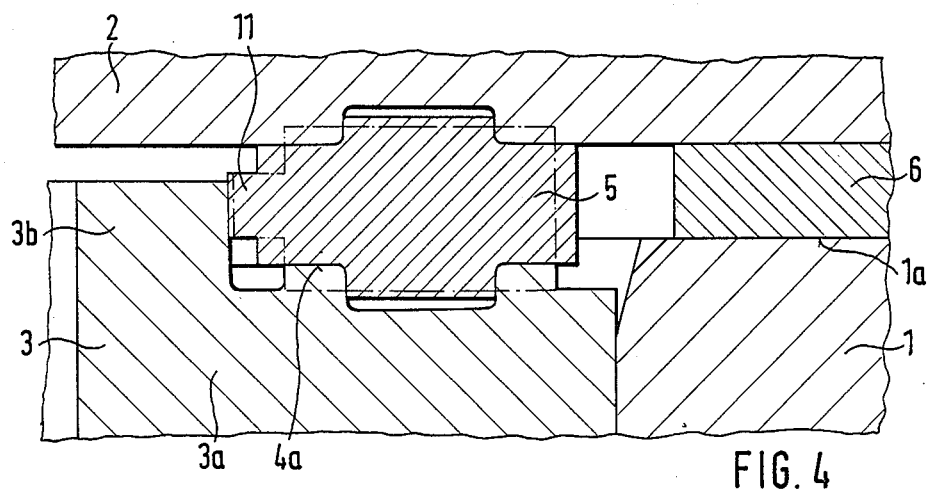
FIG. 4 is an enlarged cross-sectional view using the sealing element in FIG. 2 and taken along the line IV—IV in FIG. 2.

In FIGS. 3 and 4, additional cut-aways or recesses 12 are provided in the outermost and innermost regions of the end face 4a of the liner-collar recess 4. These recesses 12 facilitate a free radial deformation of the sealing element to the outside and to the inside due to the flow or yield process of the latter.

Summarized therefore, when compared with the sealing element of FIG. 1, the embodiment of the sealing element of FIG. 2 has the advantage of lower production costs and more foolproof assembly.

Figure 5:
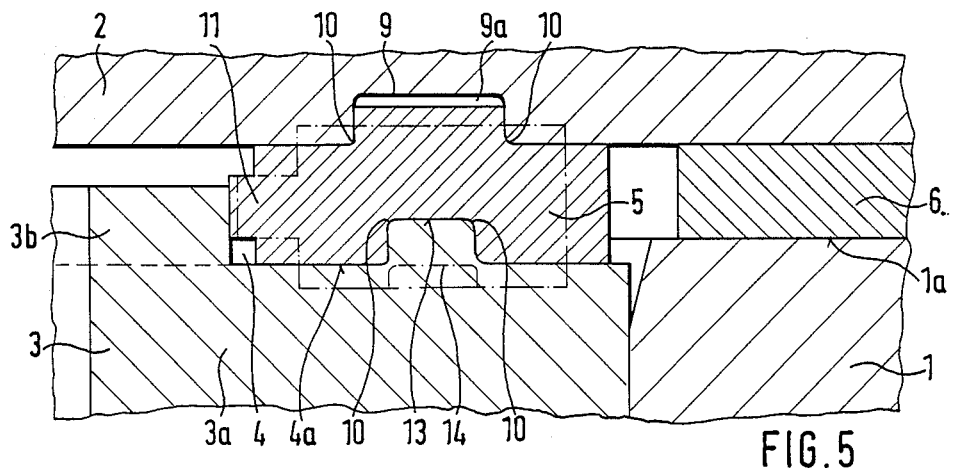
FIG. 5 is an enlarged cross-sectional view of a third exemplary embodiment of the inventive sealing arrangement, with the liner-collar recess having a circumferential rib, and with the sealing element being provided with a centering groove.

A third sealing arrangement is shown in FIG. 5. Instead of the groove 7, a circumferential land or rib 13 is disposed on the recess surface 4a of the cylinder liner collar 3a. This rib 13 is disposed opposite and roughly at the center of the radially wider groove 9 in the cylinder head 2. The sealing element 5 is centered either by three cams 11 (compare the sealing element of FIGS. 2 and 4) or by a pre-stamped or indented groove 14 in which the rib 13 engages when the sealing element 5 is inserted.

Compared with the embodiments of FIGS. 1 to 4, the rib 13 on the recess surface 4a of the liner 3 causes even greater deformation of the sealing element 5, along with deeper penetration into the recess 9 in the cylinder head 2. Thus, an enlarged positive contact on the flanks of the groove 9 and the rib 13, and hence further improvement in the labyrinth seal, is achieved.

It is also important with this embodiment that even after compression the groove 9 not be completely filled and that it retain an empty space 9a, and that the deformation of the sealing element 5 in the material yield range take place only on the outer and inner perimeters of the element.

The present invention is, of course, in no way restricted to the specific disclosure of the specification and drawings, but also encompasses any modifications within the scope of the appended claims.

What we claim is:

1. In a cylinder head sealing arrangement for a reciprocating piston engine, and in particular for placement between a cylinder head on the one hand and an associated cylinder liner and cylinder block on the other hand, to seal off a combustion chamber, whereby said sealing arrangement includes a first sealing element in the cylinder liner region and a second sealing element in the cylinder block region, both of said sealing elements being made of solid metal, with said first sealing element being disposed in a first recess in a collar of said cylinder liner, which is supported against said cylinder block, said first recess opening radially outwardly in the direction toward said cylinder block, and being disposed adjacent to a raised edge of said collar of said cylinder liner radially inwardly of said first recess, and with said first sealing element being adapted to be stressed in a certain range beyond the yield limit of the material thereof by tightening the cylinder head screws, whereby the yielding process linked to the deformation of said first sealing element, is limited by the thickness of said second sealing element and by the extent to which a base surface of said first recess in said liner collar is more remote from said cylinder head than is an end face of said cylinder block, the improvement wherein:

a first circumferentially extending groove is provide in said cylinder head, opposite said first recess in said liner collar, to receive part of said first sealing element, during said yielding process brought about by said tightening of said cylinder head, to provide a positive contact between said first sealing element and said cylinder head in the region of said first groove, whereby, however, said first groove is filled only partially by said first sealing element; and said liner collar, on said base surface of said first recess, is provided with circumferentially extending means for engaging a given portion of said first sealing element during said yielding process to provide a positive contact between said first sealing element and said circumferentially extending means.

2. A sealing arrangement according to claim 1, in which said circumferentially extending means of said base surface of said first recess of said liner collar is a circumferentially extending second groove disposed in said base surface and into which part of said first sealing element extends during said yielding process, whereby, however, said second groove is filled only partially by said first sealing element to provide a positive contact between said first sealing element and said liner collar in the region of said second groove.

3. A sealing arrangement according to claim 2, in which said first sealing element, on a side thereof remote from said cylinder head, is provided with a centering rib that engages in said second groove of said first recess of said liner collar even in a non-compressed state of said first sealing element prior to said yielding process.

4. A sealing arrangement according to claim 1, in which said circumferentially extending means of said base surface of said first recess of said liner collar is a circumferentially extending rib that projects from said base surface in a direction toward said cylinder head.

5. A sealing arrangement according to claim 4, in which said first sealing element, on a side thereof remote from said cylinder head, is provided with a further groove to effect a fixing of said first sealing element on said rib of said liner collar even in a non-compressed state of said first sealing element prior to said yielding process.

6. A sealing arrangement according to claim 1, in which said first sealing element has a radially inwardly directed peripheral surface on which are uniformly distributed centering cams that are directed toward said raised edge of said liner collar.

7. A sealing arrangement according to claim 1, in which radially innermost and outermost portions of said base surface of said first recess of said liner collar are provided with cut-aways to facilitate a free inward and outward radial deformation of said first sealing element as a consequence of said yielding process thereof.

* * * * *

UNITED STATES PATENT AND TRADEMARK OFFICE
CERTIFICATE OF CORRECTION

PATENT NO.  : 4,867,118
DATED       : Sept. 19, 1989
INVENTOR(S) : Heribert Kubis et al It is certified that error appears in the above-identified patent and that said Letters Patent is hereby corrected as shown below:

On the Title Page, the Title should read as follows:

[54] CYLINDER HEAD AND COMBUSTION CHAMBER SEALING ARRANGEMENT FOR A RECIPROCATING PISTON ENGINE

Signed and Sealed this

Twenty-third Day of October, 1990

*Attest:*

HARRY F. MANBECK, JR.

*Attesting Officer*　　　　*Commissioner of Patents and Trademarks*